United States Patent [19]

Evans et al.

[11] Patent Number: 4,605,731

[45] Date of Patent: Aug. 12, 1986

[54] METHOD FOR PREPARING LINEAR POLYCARBONATE FROM CYCLIC OLIGOMER WITH ARYL CARBANION GENERATING CATALYST

[75] Inventors: Thomas L. Evans, Clifton Park; David A. Williams, Scotia, both of N.Y.

[73] Assignee: General Electric Company, Schenectady, N.Y.

[21] Appl. No.: 723,672

[22] Filed: Apr. 16, 1985

[51] Int. Cl.$^4$ .............................................. C08G 63/62
[52] U.S. Cl. ................................... 528/371; 528/196; 528/370; 528/377; 528/378; 528/379
[58] Field of Search ............... 528/371, 370, 196, 377, 528/378, 379

[56] References Cited

U.S. PATENT DOCUMENTS

| | | | |
|---|---|---|---|
| 3,220,980 | 11/1965 | Prochaska | 528/371 |
| 3,274,214 | 9/1966 | Prochaska | 528/371 |
| 3,386,954 | 6/1968 | Schnell et al. | 528/371 |
| 3,442,854 | 5/1969 | Curtius et al. | 260/47 |

Primary Examiner—Harold D. Anderson
Attorney, Agent, or Firm—William H. Pittman; James C. Davis, Jr.; James Magee, Jr.

[57] ABSTRACT

Cyclic polycarbonate oligomers are converted to linear polycarbonate resins by heating with a polycarbonate formation catalyst which generates aryl carbanions at temperatures up to about 300° C. The preferred catalysts are tetraarylborates such as tetramethylammonium tetraphenylborate.

13 Claims, 9 Drawing Figures (I) 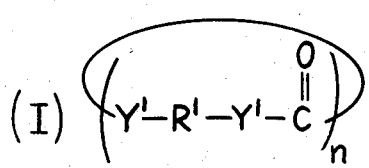  (II) $-A^1-Y^2-A^2-$
(III) $R^1(Y^1COX^1)_2$  (IV) $R^1(Y^3H)_2$
(V) 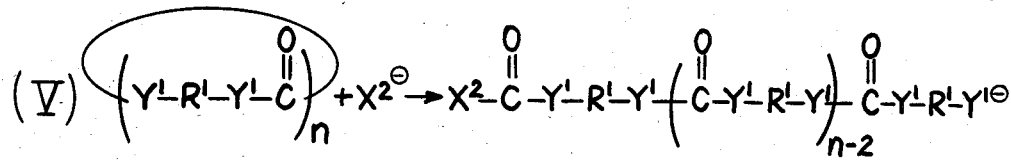
(VI) $M^{\oplus} \overset{\ominus}{B}Z_4$  (VII) $(R^2)_4 Q^{\oplus}$
(VIII) 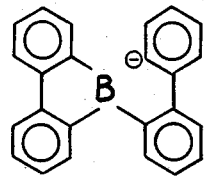
FIG. IX
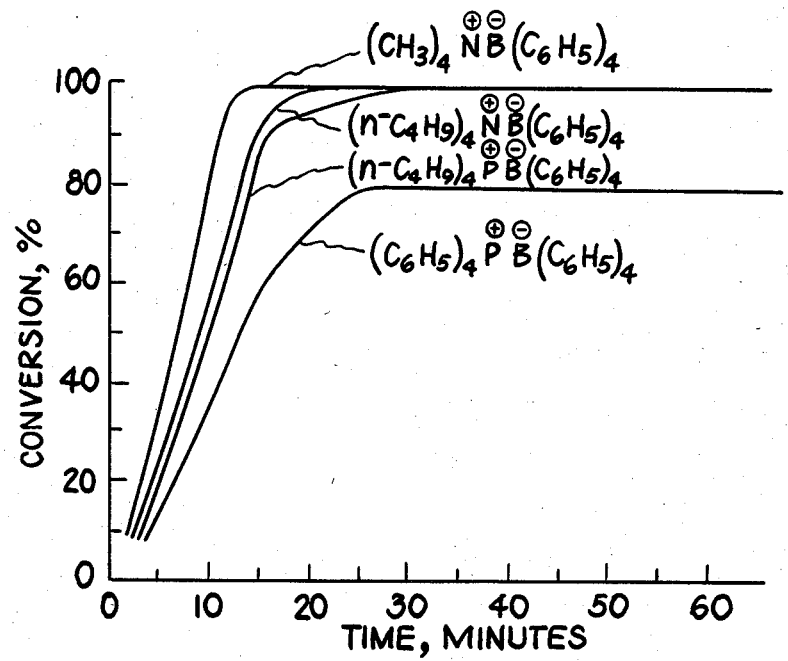

METHOD FOR PREPARING LINEAR POLYCARBONATE FROM CYCLIC OLIGOMER WITH ARYL CARBANION GENERATING CATALYST

This invention relates to the preparation of linear polycarbonates and similar condensation polymers, and more particularly to an improved method for their preparation from cyclic oligomer compositions.

The conversion of low molecular weight cyclic aromatic carbonate polymers to linear polycarbonates is known. Reference is made, for example, to the following U.S. Pat. Nos.:
3,155,683
3,274,214
3,386,954
3,422,119.

More recently, cyclic polycarbonate oligomer mixtures and similar mixtures involving thiol analogs of the carbonates have been prepared and converted to linear polycarbonates, often of very high molecular weight, by contact with various polycarbonate formation catalysts. Reference is made to copending, commonly owned application Ser. No. 704,122, filed Feb. 22, 1985, the disclosure of which is incorporated by reference herein. The polycarbonate formation catalysts disclosed as useful in said application include various bases and Lewis acids.

Several practical problems arise in polymerizations of cyclic polycarbonate oligomers by these methods. For example, the required polymerization temperatures are often too high for commercial practicability. Also, the polymerization conditions frequently lead to the formation of colored products. This is particularly true when titanium-containing catalysts are used. Since a principal utility of polycarbonates is in the formation of transparent sheet material, the presence of color therein is a serious disadvantage.

A principal object of the present invention, therefore, is to provide an improved method for the preparation of polycarbonates and similar condensation polymers.

A further object is to provide an improved method for polycarbonate formation from cyclic oligomers.

A still further object is to prepare polycarbonates by a method which is operative at commercially practical temperatures.

A still further object is to provide a polycarbonate formation method which does not introduce color into the product.

Other objects will in part be obvious and will in part appear hereinafter.

The present invention is an improvement in a method for preparing a resinous composition by contacting with a polycarbonate formation catalyst a composition comprising cyclic oligomers having formula I in the drawings, wherein each $R^1$ is independently a divalent aliphatic, alicyclic or aromatic radical, each $Y^1$ is independently oxygen or sulfur and n is from 2 to about 30; said improvement comprising employing as the polycarbonate formation catalyst at least one compound which generates aryl carbanions at temperatures up to about 350° C.

As will be apparent from the above, the cyclic oligomers useful according to this invention may contain organic carbonate, thiolcarbonate and/or dithiolcarbonate units. The various $R^1$ values therein may be different but are usually the same, and may be aliphatic, alicyclic, aromatic or mixed; those which are aliphatic or alicyclic generally contain up to about 8 carbon atoms. Suitable $R^1$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing nonhydrocarbon moieties. These may be substituents such as chloro, nitro, alkoxy and the like, and also linking radicals such as thio, sulfoxy, sulfone, ester, amide, ether and carbonyl. Most often, however, all $R^1$ radicals are hydrocarbon radicals.

Preferably at least about 60% and more preferably at least about 80% of the total number of $R^1$ values in the cyclic oligomers, and most desirably all of said $R^1$ values, are aromatic. The aromatic $R^1$ radicals preferably have formula II, wherein each of $A^1$ and $A^2$ is a single-ring divalent aromatic radical and $Y^2$ is a bridging radical in which one or two atoms separate $A^1$ from $A^2$. The free valence bonds in formula II are usually in the meta or para positions of $A^1$ and $A^2$ in relation to $Y^2$. Such $R^1$ values may be considered as being derived from bisphenols of the formula $HO-A^1-Y^2-OH$. Frequent reference to bisphenols will be made hereinafter, but it should be understood that $R^1$ values derived from suitable compounds other than bisphenols may be employed as appropriate.

In formula II, the $A^1$ and $A^2$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^2$, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula II is the 2,2-bis(4-phenylene)propane radical, which is derived from bisphenol A and in which $Y^2$ is 2,2-propylene and $A^1$ and $A^2$ are each p-phenylene.

As noted, each $Y^1$ value is independently oxygen or sulfur. Most often, all $Y^1$ values are oxygen and the corresponding compostions are cyclic polycarbonate oligomers.

The cyclic oligomers have degrees of polymerization from 2 to about 30. Cyclic oligomer mixtures are preferred, especially those in which the various molecular species have degrees of polymerization up to about 20, with a major proportion being up to about 12 and a still larger proportion up to about 15. Such mixtures have relatively low melting points as compared to single compounds such as the corresponding cyclic trimer. The cyclic oligomer mixtures are generally liquid at temperature above 300° C., most often at temperatures above 225° C. and frequently above 200° C.

The cyclic oligomer mixtures should generally contain low proportions of linear oligomers. In general, no more than about 10% by weight, and most often no more than about 5%, of such linear oligomers should be present. The mixtures also usually contain low percentages (frequently less than 30% and preferably no higher than about 20%) of polymers (linear or cyclic) having a degree of polymerization greater than about 30. These properties, coupled with the relatively low melting points and viscosities of the cyclic oligomer mixtures, contribute to their utility as resin precursors, especially for high molecular weight resins.

Suitable cyclic oligomer mixtures may be prepared by a condensation reaction involving (A) at least one compound selected from the group consisting of bishaloformates and thiol analogs thereof, said compounds having formula III, or a mixture thereof with at least one bis(active hydrogen) compound having formula IV, wherein $R^1$ and $Y^1$ are as defined hereinabove, $X^1$ is chlorine or bromine, and each $Y^3$ is independently sulfur when the corresponding $R^1$ is aliphatic or alicyclic and oxygen or sulfur when the corresponding $R^1$ is aromatic. The condensation reaction typically takes place interfacially when a solution of said compound in a substantially non-polar organic liquid is contacted with (B) a tertiary amine from a specific class and (C) an aqueous alkali metal hydroxide solution.

Reagent A, as indicated, is a composition comprising compounds of formula III (reagent A-1) and, optionally, compounds of formula IV (reagent A-2). It may also contain other compounds, including oligomers of the formula

wherein $R^1$, $Y^1$ and $X^1$ are as previously defined and n is a small number, typically about 1–4.

While the $X^1$ values in formula III may be chlorine or bromine, the bischloroformates, in which $X^1$ is chlorine, are most readily available and their use is therefore preferred. (Frequent reference to bischloroformates will be made hereinafter, but it should be understood that other bishaloformates may be substituted therefor as appropriate.) Suitable bis(active hydrogen) compounds of formula IV (reagent A-2) include diols and thiol analogs thereof having divalent radicals of formula II which are different from the corresponding divalent radicals in the compound of formula III, as well as other dihydroxyaromatic compounds and thiol analogs thereof. When such bis(active hydrogen) compounds are present, they generally comprise up to about 50%, most often up to about 20% and preferably up to about 10%, of reagent A. Most preferably, however, reagent A consists essentially of reagent A-1. Any cyclic oligomers containing divalent aliphatic radicals (or their vinylogs) flanked by two oxygen atoms are prepared by using a mixture of compounds identifiable as reagent A-1.

The tertiary amines useful as reagent B ("tertiary" in this context denoting the absence of N—H bonds) generally comprise those which are oleophilic (i.e., which are soluble in and highly active in organic media, especially those used in the oligomer preparation method), and more particularly those which are useful for the formation of polycarbonates. Reference is made, for example, to the tertiary amines disclosed in the aforementioned U.S. Pat. No. 4,217,438 and in U.S. Pat. No. 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reactive system; that is, for which the organic-aqueous partition coefficient is greater than 1. This is true because intimate contact between the amine and reagent A is essential for the formation of the cyclic oligomer mixture. For the most part, such amines contain at least about 6 and preferably about 6–14 carbon atoms.

The amines most useful as reagent B are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Reagent C is an aqueous alkali metal hydroxide solution. It is most often lithium, sodium or potassium hydroxide, with sodium hydroxide being preferred because of its availability and relatively low cost. The concentration of said solution is about 0.2–10M and preferably no higher than about 3M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture, in step I the reagents and components are maintained in contact under conditions wherein reagent A is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method reagent A or reagents A and B are added gradually to a mixture of the other materials. It is within the scope of this embodiment to incorporate reagent B in the mixture to which reagent A is added, or to add it gradually, either in admixture with reagent A or separately. Continuous or incremental addition of reagent B is frequently preferred, whereupon the cyclic oligomer mixture is obtained in relatively pure form and in high yield.

Although addition of reagent A neat (i.e., without solvents) is within the scope of this embodiment, it is frequently inconvenient because many bischloroformates are solids. Therefore, it is preferably added as a solution in a portion of the organic liquid, especially when it consists essentially of reagent A-1. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to high polymer and insoluble and/or intractable by-products, it is preferred to use not more than about 0.7 mole of reagent A (calculated as bisphenol bischloroformate) per liter of organic liquid present in the reaction system, including any liquid used to dissolve reagent A. Preferably, about 0.003–0.6 mole of reagent A is used when it consists entirely of reagent A-1, and no more than about 0.5 mole is used when it is a mixture of reagents A-1 and A-2. It should be noted that this is not a molar concentration in the organic liquid when reagent A is added gradually, since said reagent is consumed as it is added to the reaction system.

The molar proportions of the reagents constitute another important feature for yield and purity maximization. The preferred molar ratio of reagent B to reagent A (calculated as bisphenol bischloroformate) is about 0.1–1.0:1 and most often about 0.2–0.6:1. The preferred molar ratio of reagent C to reagent A is about 1.5–3:1 and most often about 2–3:1.

Step II of the cyclic oligomer preparation method is the separation of the oligomer mixture from at least a portion of the high polymer and insoluble material present. When other reagents are added to reagent C and the preferred conditions and material proportions are otherwise employed, the cyclic oligomer mixture (obtained as a solution in the organic liquid) typically contains less than 30% by weight and frequently less than about 20% of high polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using as reagent B at least one aliphatic or heterocyclic tertiary amine which, under the reaction conditions, dissolves preferentially in the organic phase of the reaction system, and gradually adding reagents A, B and C simultaneously to a substantially non-polar organic liquid or a mixture of said liquid with water, said liquid or mixture being maintained at a temperature in the range of about 0°–50° C.; the amount of reagent A used being up to about 0.7 mole for each liter of said organic liquid present in the reaction system, and the molar proportions of reagents A, B and C being approximately as follows:

B:A—0.2–1.0:1
C:A—2–3:1;

and recovering the cyclic oligomers thus formed.

As in the embodiment previously described, another portion of said liquid may serve as a solvent for reagent A. Addition of each reagent is preferably continuous, but may be incremental for any or all of said reagents.

Among the principal advantages of this preferred embodiment are the non-criticality of the degree of dilution of the reagents and the ability to complete the addition and reaction in a relatively short time, regardless of reaction scale. It ordinarily takes only about 25–30 minutes to complete cyclic oligomer preparation by this method, and the cyclic oligomer yield may be 85–90% or more. The crude product usually also contains only minor amounts of high molecular weight linear polycarbonates as by-products. By contrast, use of a less preferred embodiment may, depending on reaction scale, require an addition period as long as 8–10 hours and the crude product may contain substantial proportions of linear by-products with molecular weights of about 4,000–10,000, which, if not removed, may interfere with subsequent polymerization of the cyclic oligomers by acting as chain transfer agents.

It is believed that the advantageous results obtained by employing the preferred embodiment are a result of the relatively low pH of the reaction mixture, typically about 9–10. When reagent A (and optionally reagent B) is added to reagent C, on the other hand, the initial pH is on he order of 14.

When step II is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The preparation of cyclic oligomer mixtures is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLES A–S

Bisphenol A bischloroformate was reacted with aqueous sodium hydroxide and triethylamine in an organic liquid (chloroform in Example G, methylene chloride in all other examples) according to the following procedure: The bischloroformate was dissolved in half the amount of organic liquid employed and was added gradually, with slow stirring, to the balance of the reaction mixture. In Examples A–K and M, the triethylamine was all originally present in the reaction vessel; in Examples O–Q, it was added gradually at the same time as the bischloroformates; and in Examples L, N, R and S, it was added incrementally at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymers were precipitated by addition of acetone.

The reaction conditions for Examples A–S are listed in Table I together with the approximate percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

The Z values in formula VI may be phenyl radicals or substituted phenyl radicals wherein the substituents may be $C_{1-4}$ alkyl, aryl, halo, nitro, $C_{1-4}$ alkoxy or the like. Any substituents are preferably electron-withdrawing groups such as halo or nitro, but unsubstituted phenyl radicals are most preferred. It is also possible for two Z values together to form a divalent radical such as

TABLE 1

| Example | Bischloroformate amt., mmol/l. org. liquid | Bischloroformate amt., total mmol. | NaOH molarity | Molar ratio, amine:bis-chloroformate | Temperature | Addition time, min. | % oligomer in product |
| --- | --- | --- | --- | --- | --- | --- | --- |
| A | 100 | 2 | 0.313 | 0.5 | 20 | 30 | 97 |
| B | 100 | 2 | 0.625 | 0.5 | 20 | 30 | 95 |
| C | 100 | 2 | 2.5 | 0.5 | 35 | 55 | 93 |
| D | 100 | 2 | 2.5 | 0.5 | 0 | 30 | 77 |
| E | 100 | 2 | 2.5 | 0.5 | 20 | 30 | 87 |
| F | 100 | 2 | 2.5 | 0.5 | 35 | 30 | 78 |
| G | 100 | 2 | 2.5 | 0.5 | 50 | 30 | 88 |
| H | 100 | 2 | 2.5 | 0.25 | 20 | 30 | 74 |
| J | 100 | 1 | 2.5 | 0.2 | 20 | 15 | 75 |
| K | 200 | 4 | 2.5 | 0.5 | 20 | 30 | 88 |
| L | 500 | 10 | 2.5 | 0.25 | 25 | 105 | 83 |
| M | 500 | 10 | 2.5 | 0.25 | 25 | 105 | 78 |
| N | 500 | 10 | 2.5 | 0.25 | 25 | 105 | 83 |
| O | 500 | 10 | 2.5 | 0.25 | 25 | 105 | 87 |
| P | 500 | 10 | 2.5 | 0.29 | 30 | 90 | 78 |
| Q | 500 | 10 | 2.5 | 0.25 | 30 | 20 | 75 |
| R | 500 | 10 | 2.5 | 0.25 | 40–45 | 105 | 79 |
| S | 500 | 10 | 2.5 | 0.4 | 25 | 105 | 79 |

EXAMPLE T

Bisphenol A bischloroformate (2.0 mmol.) was reacted with aqueous sodium hydroxide and 4-dimethylaminopyridine in methylene chloride. The procedure employed was that of Example 1, except that 66.67 mmol. of bisphenol A per liter of methylene chloride was employed, the aqueous sodium hydroxide concentration was 5.0M and the reaction temperature was about 25° C. The product comprised 85% cyclic oligomer.

According to the present invention, conversion of the above-described cyclic oligomers to linear polycarbonate is effected by contact with a polycarbonate formation catalyst which generates aryl carbanions. Said carbanions are very strong nucleophiles. While the present invention is not dependent on any theory or reaction mechanism, it is believed that said carbanions undergo an addition reaction with the electrophilic carbonate carbon atoms in accordance with equation V, wherein n is the number of structural units in the oligomer molecule and $X^2$ is the carbanion. The product of this step is a highly reactive linear oxy anion which in turn undergoes an addition reaction with further carbonate moieties, forming "living" linear polycarbonate species.

A preferred method for generating aryl carbanions is by the dissociation of a coordination compound containing a polyaryl-substituted anion. A highly preferred class of coordination compounds of this type is represented by formula VI, wherein M is one equivalent of a cation other than hydrogen and Z is an aromatic radical or two Z values taken together form a divalent aromatic radical.

The M value may be any metal cation, with alkali metals, especially lithium, sodium and potassium, being preferred. More desirably however, it has formula VII, wherein each $R^2$ is independently a $C_{1-4}$ primary alkyl or $C_{6-10}$ aryl radical, preferably alkyl and most desirably methyl, and Q is nitrogen, phosphorus or arsenic.

2,2-biphenylene. When Z is monovalent (e.g., phenyl), its structure is identical to that of $X^2$; when Z is divalent (e.g., 2,2'-biphenylene), $X^2$ may have a structure of the type represented by formula VIII.

Thus, it will be apparent to those skilled in the art that suitable catalytic species include such compounds as lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. As between these and similar catalysts, the choice may be dictated by such factors as the desired rate of reaction and the chemical nature of the oligomer composition being polymerized. For the preparation of aromatic polycarbonates such as bisphenol A polycarbonate, the preferred catalysts are the tetra-n-alkylammonium and tetra-n-alkylphosphonium tetraphenylborates. Tetramethylammonium tetraphenylborate is particularly preferred because of its high activity as a catalyst and endcapping agent (as described hereinafter), relatively low cost and ease of preparation from tetramethylammonium hydroxide and an alkali metal tetraphenylborate.

The polymerization reaction is typically effected by merely contacting the cyclic oligomer mixture with the catalyst at temperatures up to 350° C., preferably about 200°–300° C., until polymerization has proceeded to the extent desired. Although a solvent may be used, it is not necessary and is frequently not preferred. It is within the scope of the invention to conduct the polymerization in a mold to produce a molded article.

The required temperature is dependent to some extent on the identity of the catalyst. One reason for the preference for quaternary ammonium and phosphonium tetraphenylborates is that they are extremely active at temperatures as low as 200° C., effecting essentially 100% conversion to catalyst in about 10–30 minutes. This is evident from FIG. IX, which is a graph showing percent conversion to linear polycarbonate at 200° C. of cyclic bisphenol A polycarbonate oligomer mixtures having degrees of polymerization of about 2-12 as a function of time, using 0.1 mole percent of various catalysts in accordance with this invention. Sodium tetraphenylborate, on the other hand, is essentially ineffective as a catalyst at 200° C. but is effective at 250° C.

Another reason the quaternary catalysts are often preferred is their capability of serving as endcapping agents for the linear polycarbonates. The cations in such compounds decompose in the presence of "living" anionic polymer species of formula V, yielding tertiary amines or phosphines and substantially unreactive polymer end groups. With methyl or phenyl substituents, methoxy or phenoxy end groups are produced; with higher alkyl substituents, a mixture of alkoxy and hydroxy end groups and olefinic by-products. This decomposition is slow enough under polymerization conditions to permit complete conversion to polymer before it takes place.

The proportion of catalyst used in the method of this invention will depend to some extent on the molecular weight of the polymer desired and the time available for completion of the polymerization reaction. Since a "living" polymerization is involved, the molecular weight of the polymer will vary inversely with the proportion of catalyst used. On the other hand, the reaction rate varies directly with the proportion of catalyst. Therefore, as said proportion is increased, the time required for polymerization and the molecular weight of the product both decrease.

Balancing these factors, it is generally found that catalyst proportions of about 0.001-0.5 mole percent, based on carbonate units in the oligomer, is satisfactory. In the case of bisphenol A polycarbonate oligomer mixture and tetramethylammonium tetraphenylborate, the polymerization reaction is complete in less than 5 minutes at 0.05 mole percent catalyst and in approximately 60 minutes at 0.0013 mole percent.

The method of this invention is illustrated by the following examples. All parts and proportions are by weight unless otherwise indicated. Molar amounts of cyclic oligomers are based on structural units therein. Molecular weights were determined by gel permeation chromatography.

EXAMPLE 1

A solid mixture of 500 parts (1.97 mmol.) of a cyclic bisphenol A polycarbonate oligomer mixture containing oligomers with degrees of polymerization from 2 to about 12 and 1 part (0.0026 mmol.) of tetramethylammonium tetraphenylborate was intimately mixed and heated under nitrogen at 250° C. for four hours. The mixture was cooled, dissolved in methylene chloride and reprecipitated by pouring into methanol. The solid linear polycarbonate was removed by filtration and dried. It had a weight average molecular weight of 345,000 and a number average molecular weight of 41,800.

EXAMPLE 2

Following the procedure of Example 1, a mixture of 1000 parts (3.94 mmol.) of cyclic bisphenol A polycarbonate oligomer mixture and 3 parts (0.0088 mmol.) of sodium tetraphenylborate was heated and the linear polycarbonate was isolated. It was found to have a weight average molecular weight of 249,100 and a number average molecular weight of 4900.

EXAMPLE 3

A blend of 2 parts (7.87 mmol.) of the cyclic bisphenol A polycarbonate oligomer mixture of Example 1 and 1.95 parts (0.005 mmol.) of tetramethylammonium tetraphenylborate was prepared by thoroughly grinding together solid oligomer and catalyst. The blend was charged to a circular mold having an inner diameter of 1 inch (2.54 cm.), which had been preheated to 250° C. The mold was closed and heated at 250° C. for 3 minutes without applied pressure and for an additional time under a force of 2 tons (1.8 metric tons). It was then opened and the polycarbonate disk was removed. It was homogeneous, tough and could not be broken by bending. A portion of the disk was dissolved in methylene chloride and the weight and number average molecular weights of the linear polycarbonate were found to be 363,000 and 170,000, respectively.

EXAMPLE 4

A cyclic bisphenol A polycarbonate oligomer mixture similar to that of Example 1 was dissolved in methylene chloride and reprecipitated by adding acetone. Oligomers of high degree of polymerization were removed by dissolution in a 20% (by volume) solution of acetone in hexane. The residue was extracted with a 60% (by volume) solution of acetone in hexane. Upon refrigeration of the extracts, the substantially pure cyclic tetramer precipitated and was isolated.

A mixture of 2000 parts (7.88 mmol.) of tetramer, 0.4 part (0.001 mmol.) of tetramethylammonium tetraphenylborate and 3 parts of 2,4-dichlorotoluene was heated under reflux for 2½ hours, during which time linear bisphenol A polycarbonate formed and precipitated. The mixture was cooled and stirred with methylene chloride for 18 hours. The polycarbonate was reprecipitated by pouring into methanol, redissolved, reprecipitated into acetone and dried. It was found to have weight average molecular weight of 1,037,000 and a number average molecular weight of 125,000.

EXAMPLE 5

A solution of 5 parts of a cyclic oligomer mixture similar to that of Example 1 but prepared from a mixture of 85 mole percent bisphenol A bischloroformate and 15 mole percent hydroquinone and 0.1 mole percent of tetramethylammonium tetraphenylborate was evaporated to dryness under vacuum, and the resulting blend was dried in a vacuum oven at 80° C. for 10 hours. A sample of the blend was heated under nitrogen at 250° C. for 2 hours. The resulting polymer was dissolved in methylene chloride, precipitated into methanol, redissolved and reprecipitated by pouring into acetone. It had a weight average molecular weight of 293,000, a number average molecular weight of 101,300 and a glass transition temperature of 157° C.

What is claimed is:

1. In a method for preparing a resinous composition by contacting with a polycarbonate formation catalyst a composition comprising cyclic oligomers having the formula

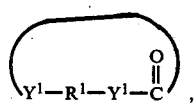 (I)

wherein each $R^1$ is independently a divalent aliphatic, alicyclic or aromatic radical, each $Y^1$ is independently oxygen or sulfur and n is from 2 to about 30; the improvement which comprises employing as the polycarbonate formation catalyst at least one compound which generates aryl carbanions at temperatures up to about 300° C.

2. A method according to claim 1 wherein the polycarbonate formation catalyst has the formula $$M^{\oplus}{}^{\ominus}BZ_4, \tag{VI}$$

wherein M is one equivalent of a cation other than hydrogen and Z is an aromatic radical or two Z values taken together form a divalent aromatic radical.

3. A method according to claim 2 wherein each Z is unsubstituted phenyl.

4. A method according to claim 3 wherein M is lithium, sodium or potassium or has the formula $$(R^2)_4Q^{\oplus}, \tag{VII}$$

wherein each $R^2$ is independently a $C_{1-4}$ primary alkyl or $C_{6-10}$ aryl radical and Q is nitrogen, phosphorus or arsenic.

5. A method according to claim 4 wherein the polycarbonate formation catalyst is a tetra-n-alkylammonium or tetra-n-alkylphosphonium tetraphenylborate.

6. A method according to claim 5 wherein each $R^1$ has the formula $$-A^1-Y^2-A^2-, \tag{II}$$

each $Y^1$ is oxygen, each $A^1$ and $A^2$ is a single-ring divalent aromatic radical and $Y^2$ is a bridging radical in which one or two atoms separate $A^1$ from $A^2$.

7. A method according to claim 6 wherein the catalyst is present in the amount of about 0.001–0.5 mole percent, based on carbonate units in the oligomer.

8. A method according to claim 7 wherein the reaction temperature is within the range of about 200°–300° C.

9. A method according to claim 8 wherein the cyclic oligomer composition is a cyclic oligomer mixture in which the molecular species have degrees of polymerization up to about 20.

10. A method according to claim 9 wherein $Y^2$ is 2,2-propylene and $A^1$ and $A^2$ are each p-phenylene.

11. A method according to claim 10 wherein a major proportion of the molecular species in the cyclic oligomer mixture have degrees of polymerization up to about 12.

12. A method according to claim 11 wherein the polycarbonate formation catalyst is a tetraalkylammonium compound.

13. A method according to claim 12 wherein the polycarbonate formation catalyst is tetramethylammonium tetraphenylborate.

* * * * *